(12) United States Patent
Wang et al.

(10) Patent No.: US 7,529,397 B2
(45) Date of Patent: May 5, 2009

(54) AUTOMATIC SEEDING POINTS SELECTION FOR DTI FIBER TRACKING

(75) Inventors: Zhizhou Wang, Plainsboro, NJ (US); Yuanhsi (Tony) Chen, Mt. Laurel, NJ (US); Mariappan S. Nadar, Plainsboro, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 695 days.

(21) Appl. No.: 11/333,177

(22) Filed: Jan. 17, 2006

(65) Prior Publication Data

US 2006/0269107 A1 Nov. 30, 2006

Related U.S. Application Data

(60) Provisional application No. 60/684,659, filed on May 26, 2005.

(51) Int. Cl.
*G06K 9/00* (2006.01)
*G06K 9/56* (2006.01)

(52) U.S. Cl. ...................................... 382/128; 382/308

(58) Field of Classification Search ......... 382/128–132, 382/100, 254, 173, 225, 286, 308; 345/418–421, 345/425; 600/300–301, 407–423, 430, 544–545, 600/442, 921; 128/920, 922; 377/10–18; 424/9.1; 434/256–258; 324/306–309, 318–322
See application file for complete search history.

(56) References Cited

OTHER PUBLICATIONS

Preoperative and Intraoperative Diffusion Tensor Imaging-Based Fiber Tracking in Glioma Surgery; Christopher Nimsky, M.D., Oliver Ganslandt, M.D., Peter Hastreiter, Ph.D., Ruopeng Wang, Ph.D., Thomas Benner, Ph.D., A. Gregory Sorensen, M.D., Rudolf Fahlbush, M.D.; Journal of Neurosurgery 56:130-138, 2005; DOI: 10.1227/01.NEU.0000144842.18771.30.*

Measurement of fractional anisotropy using diffusion tensor MRI in supratentorial astrocytic tumor; Takaaki Beppu, Takashi Inoue, Yuji Shibata, Akira Kurose, Hiroshi Arai, Kuniaki Ogasawara, Akira Ogawa, Shinichi Nakamura, Hiroyuki Kabasawa; Journal of Neuro-Oncology 63: 109-116, 2003. 2003 Kluwer Academic Publishers, Printed in Netherland.*

Gonzalez, Rafael C., et al., "Digital Image Processing, Second Edition", *Prentice Hall, Section 10.4.2 Region Growing*, (2002), pp. 613-615.

Haralick, Robert M., et al., "Image Segmentation Techniques", *Computer Vision, Graphics, and Image Processing 29*, (Jan. 1985), pp. 100-132.

Ibanez, Luis , et al., "The ITK Software Guide, Second Edition, Updated for ITK version 2.4", *Section 9.1 Region Growing*, (Nov. 21, 2005), pp. 503-524.

Yoo, Terry , "Insight into Images: Principles and Practice for Segmentation, Registration, and Image Analysis", *Section 5.3 Region Growing*, (2004), pp. 124-126.

\* cited by examiner

*Primary Examiner*—Samir A. Ahmed
*Assistant Examiner*—Mehdi Rashidian
(74) *Attorney, Agent, or Firm*—Donald B. Paschburg

(57) ABSTRACT

The present invention discloses methods for automatically generating regions of seeding points for fiber tracking in diffusion tensor images. These methods are based on connected region grow. Seeding point selection criteria involving Fractional Anisotropy thresholding and Dominant Eigen Vector similarity are also disclosed.

18 Claims, 4 Drawing Sheets

AUTOMATIC SEEDING POINTS SELECTION FOR DTI FIBER TRACKING

STATEMENT OF RELATED CASES

This application claims the benefit of U.S. Provisional Application No. 60/684,659, filed May 26, 2005, which is incorporated herein by reference.

BACKGROUND OF THE INVENTION

This invention relates to systems and methods for processing digital images. More specifically, it relates to systems and methods for processing Diffusion Tensor images of matter such as neural fibers and the tracking of the path of said matter.

Digital images are very prevalent in many technological applications. For example, there are numerous types of digital images used in medical diagnosis today, including but not limited to Diffusion Tensor images (DTI) created by Magnetic Resonance Imaging.

The processing of digital images has become very complicated. As a result, the processing of digital images can often require significant processing resources. Further, the processing of digital images can also be very time consuming.

For example, it is frequently desired to segment objects in a digital image. During segmentation of objects, it is necessary to seed the to be segmented object in an image by selecting one or more pixels or one or more voxels located inside the object image which will then act as a starting point of a specific trace. Various processing techniques can be used to segment and to further process the object image once proper seeds are selected.

One of the problems is that selecting the seeds can be difficult or time consuming. The seeds are typically selected by a user. Often times, the selected seeds do not lead to a proper segmentation of the object. In these cases, new seeds must be selected and the processing repeated. Thus, already lengthy and resource intensive processing must be repeated.

Accordingly, new and improved systems and methods for seeding and for segmenting an object in a digital image are needed.

SUMMARY OF THE INVENTION

One aspect of the present invention provides a method of processing a digital image having an object and a selected pixel from the digital image. The method includes selecting a first pixel and a second pixel in the digital image. Then a software application determines whether a Fractional Anisotropy or FA value associated with the second pixel is greater than or equal to a first threshold. The software application also determines whether a difference between Dominant Eigen Vector or DEV value associated with the second pixel and a DEV value associated with the selected pixel is less than or equal to a second threshold. Then, if the FA value associated with the second pixel is greater than or equal to the first threshold and the DEV difference is less than or equal to the second threshold, the software application establishes a set having the second pixel and the selected pixel as elements.

The first pixel is also preferably included in the set. In accordance with a further preferred embodiment of the present invention, the processing is done only if the first selected pixel has an FA value greater than or equal to the first threshold.

In accordance with a further aspect of the present invention, a plurality of pixels in a digital image are processed using this process to determine which pixels can be selected as seeding points in relation with the first pixel.

Thus, in accordance with a further aspect of the present invention, a plurality of pixels in the digital image are selected. Then, for one of the plurality of pixels, it is determined whether an FA value associated with the one of the plurality of pixels is greater than or equal to the first threshold and whether a difference between a DEV value associated with the one of the plurality of pixels and a DEV value associated with the selected pixel is less than or equal to a second threshold. If the FA value associated with the one of the plurality of pixels is greater than or equal to the first threshold and the difference between a DEV value associated with the one of the plurality of pixels and a DEV value associated with the selected pixel is less than or equal to the second threshold, then the one of the plurality of pixels is included in the set of seeding points.

The processing of the plurality of pixels continues in accordance with this process.

In accordance with a further aspect of the present invention, the pixels in the set are selected as the object.

All pixels in an image can be processed as described herein. It is, however, preferred to limit the processing through a region growing process. In accordance with one aspect of the present invention, processing in a direction in the digital image stops when not a single pixel of the plurality of pixels satisfies: FA value associated with the pixel is greater than or equal to the first threshold and the difference between a DEV value associated with the pixel and a DEV value associated with the selected pixel is less than or equal to the second threshold.

The first threshold can be user selected or present in the software application. The second threshold can also be user selected or preset. A preferred value of the first threshold is 0.2. The second threshold depends upon many factors, including the selected object.

DESCRIPTION OF A PREFERRED EMBODIMENT

The present invention is applied to select seeding points for fiber tracking in Diffusion Tensor images. It is one aspect of the present invention to create seeding points for fiber tracking in regions of interest. It is another aspect of the present invention to automatically select seeding points in a region defined by a single, user selected, seeding point. It is another aspect of the present invention to create a segment with seeding points, and to limit the required processing by using connected region growth. It is clear that different approaches of different complexities can be applied to select the next pixel for examination to reduce processing costs. It is to be understood that the circular approach to region growing is used herein as an illustrative example.

Figure 1:
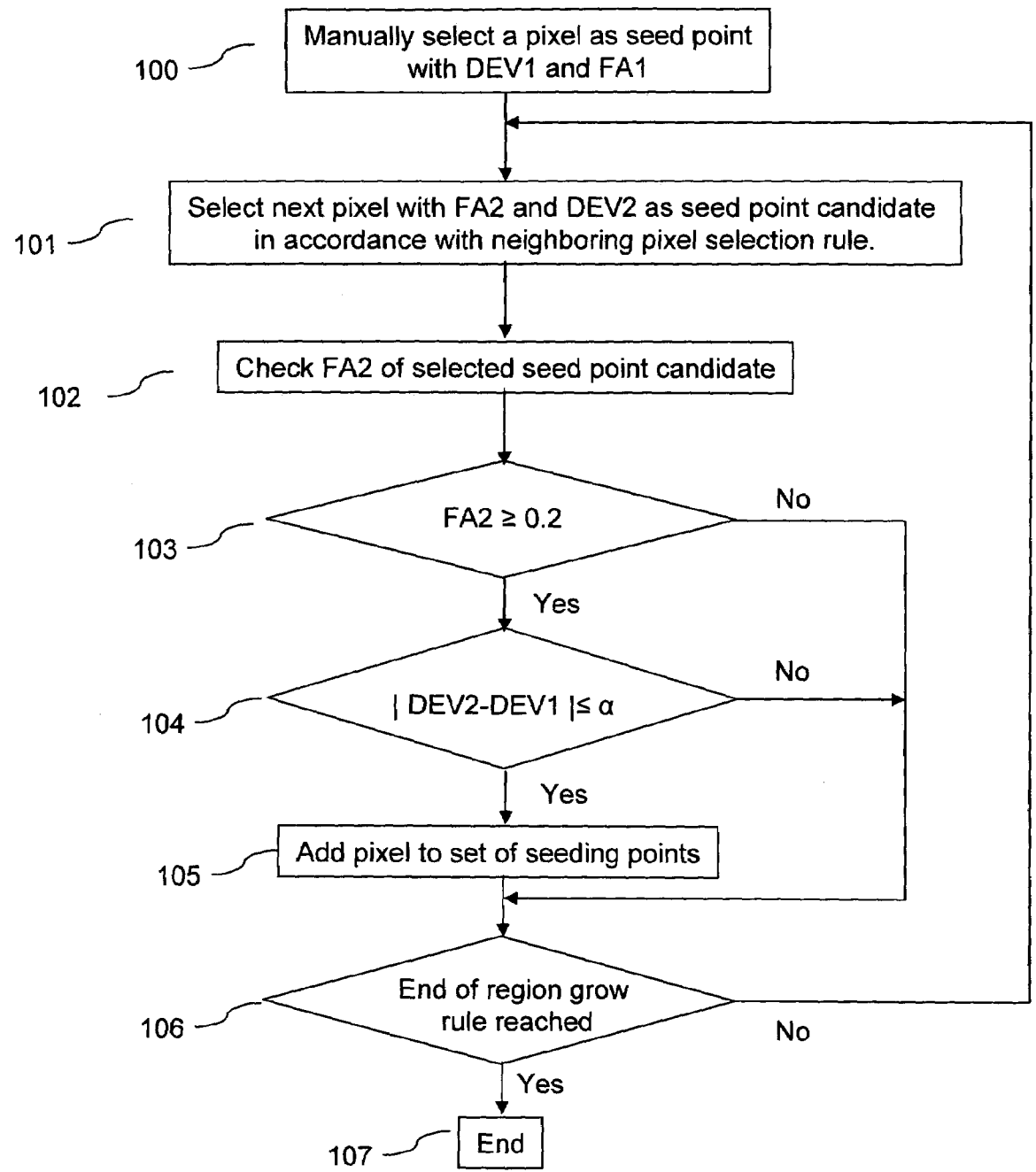
FIG. 1 illustrates a method in accordance with one aspect of the present invention.

The process of initiating and automatically creating a region of seeding points for fiber tracking is shown in a flow diagram in FIG. 1. It shows how the growing criteria to include or not include a pixel as a seeding point are particularly tailored for DTI application.

Now referring to FIG. 1, the seeding process is initiated by the user selection of an initial seeding point in an image region of interest, as shown in step 100 of FIG. 1. As is known to one skilled in the art, the selected pixel has both a FA value which is assumed to be FA1 and a DEV value which is assumed to be a value DEV1. According to one aspect of the present invention it is assumed that the initial user selected seeding point has an FA value that is not less than 0.2. If the FA of the selected pixel is less than 0.2 then the selected pixel is rejected as initial seeding point and a new pixel has to be selected by the user. Thus, the processing, preferably limited by the use of a connected region grow process, will start once a user selected pixel has an FA equal to or greater than 0.2. Alternate values of FA threshold other than 0.2 can be used. Further, the FA threshold can be a user selected value.

According to one aspect of the present invention, a next pixel is selected as a seeding point candidate according to a neighboring pixel selection rule. This next pixel will be removed from the remainder of to be checked collection of pixels after it has been examined. This selected pixel has an FA value of FA2 and a DEV value of DEV2. This step is illustrated in step 101 of FIG. 1. In the next step, the FA value of this selected pixel is checked as shown in box 102 to determine, if the value of FA2 is greater than or equal to 0.2. As shown in step 103, if the FA value FA2 of this selected pixel is smaller than 0.2, this pixel will not be included as a seeding point. If FA2 is less than 0.2, then in step 106, it is preferred to see if any further processing should take place in accordance with a region grow rule. When the end of the region grow rule has been reached, there are no more pixels to be checked and the creation of a region with seeding points has been completed, as is shown in box 107 of FIG. 1. When the region rule has not reached its end, there are additional pixels to be checked and the process returns to box 101. A new pixel according to the neighboring pixel selection rule will be selected as shown in box 101.

If the inequality of step 103 is satisfied, then processing continues with step 104. Thus, in step 104 when the FA value FA2 of a selected pixel is equal to or greater than 0.2, the DEV value DEV2 of the selected pixel will be checked against the DEV value DEV1 of the initial seeding point. If the DEV value DEV2 of this selected pixel has a value that differs more than a preset or user selected value a from the DEV value DEV1 of the user selected seeding point, the present pixel will not be included as a seeding point. The process according to the present invention will then check if the end of the region grow rule has been reached as shown in step 106. If the DEV value DEV2 of the present pixel differs an amount equal or smaller than a from the DEV value DEV 1 of the user selected seeding point, the present pixel will be included in the group of seeding points. The process according to the present invention will then check if the end of the region grow rule has been reached. If that is the case, the process is completed. If not, the process will return to box 101 and will select the next to be examined pixel as shown in box 101. By using two control parameters in selecting seeding points flexibility has been provided without loss of simplicity.

This process results in the segmentation of the initially seeded object in an image. Thus, the present invention provides a method and system for quickly segmenting an object in a DTI image.

In an alternate embodiment, all of the pixels in an image can be processed. In this case, in step 106, the method of the present invention determines whether all pixels have been processed, and neighboring pixel selection rules are not used to limit processing of pixels. It is, however, preferred to use neighboring pixel selection rules to limit the number of pixels processed.

Figure 2:
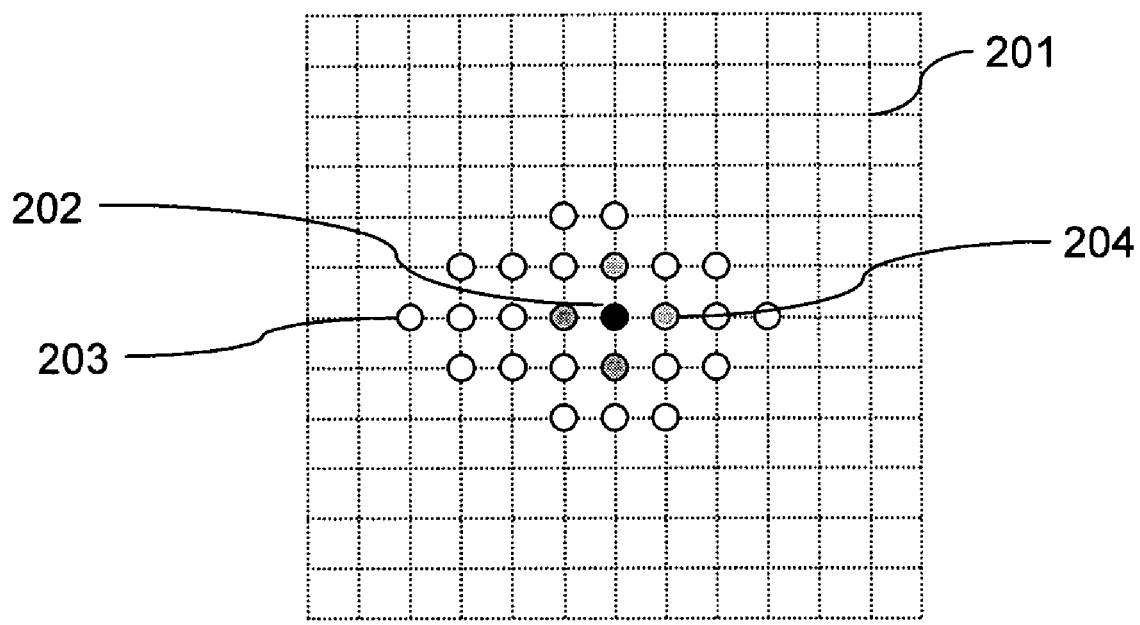
FIGS. 2 and 3 illustrate a growth region search process used in accordance with another aspect of the present invention.

Now referring to FIG. 2 an illustrative diagram shows a neighboring pixel selection rule useful to reduce the processing required by the processor of the present invention. FIG. 2 shows how the location of pixels in a 2-D image can be represented. The concept is easily extendible to a 3-D image. In a two-dimensional representation the pixels may be assumed to exist in a raster 200, comprised of vertical and horizontal raster lines. The pixels may, for example, be assumed to exist on the cross point of a vertical and a horizontal raster line, such as provided by point 201 in FIG. 2. The diagram of FIG. 2 shows an illustrative example of a neighboring pixel selection rule. The region starts at user selected seed point 202. The rule in this example is, as a first step, to select pixels that are neighbors of the user selected seeding point. Each selected pixel will be checked to see if they can be added to the set of seeding points according to the procedure provided in the flow diagram of FIG. 1 (that is, is FA$\geq$0.2 and is |DEV(n)−DEV(n−1)|$\leq\alpha$). If no seeding points were identified among selected pixels, the neighboring pixel selection has reached its end and the process is terminated. If qualifying seeding points are identified, then as a second step additional pixels which are neighbors of the seeding points identified in the previous step will now be tested according to the procedure described in the flow diagram of FIG. 1. If no additional seeding points are identified the process will have reached its end and will be terminated. When additional seeding points have been identified in a second step, the region grow has not reached its end and pixels which are neighbors of the new seeding points identified in the previous step will be selected. This process will continue until an added region will not comprise additional seeding points and the neighboring pixel selection rule will have reached its end.

Figure 3:
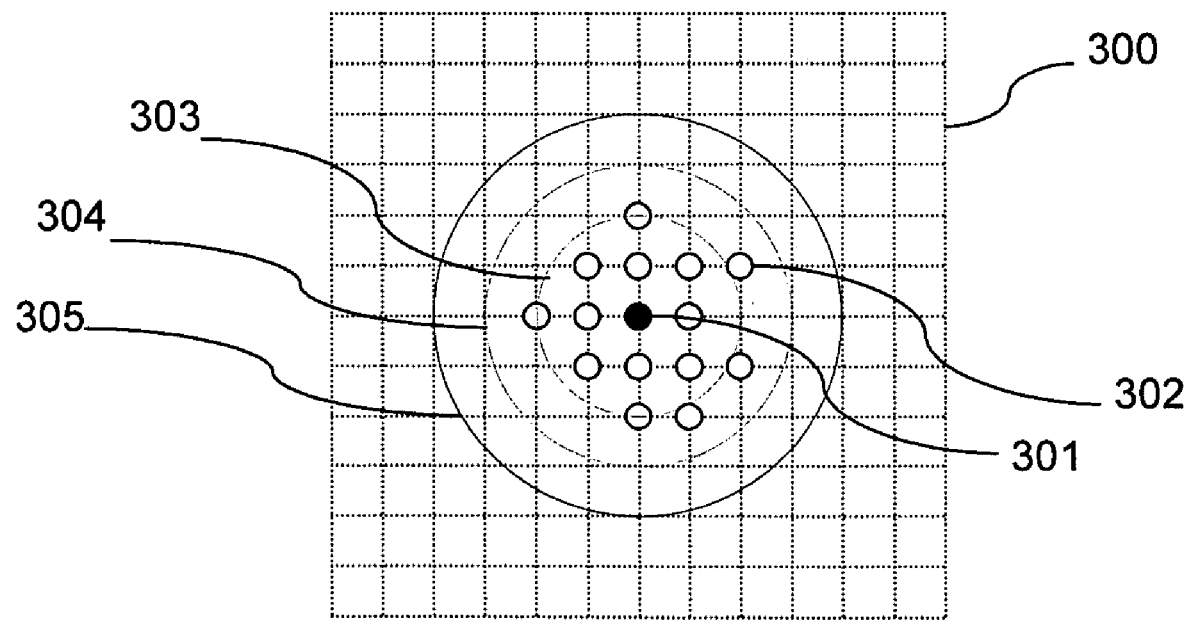

Now referring to FIG. 3, it will be shown as an illustrative example how a neighboring pixel selection will terminate. As explained before there can be different rules to select a pixel for examination. In order to prevent excessive pixel checking and assure creating connected regions, only pixels should be examined that are direct neighbors to validated seeding points. It is assumed in this illustrative example that only pixels that are direct neighbors of seeding points in a region will be examined. A user selected seeding point exists at 301 in a pixel raster 300. Circles 303, 304 and 305 show the pixel areas according to a possible neighboring pixel selection rule. It shows that the area within 303 contains pixels that are validated seeding points according to the procedure as shown in the flow diagram of FIG. 1. The area outside 303 but within 304 still comprises pixels which are validated seeding points and the region grow rule will not terminate. The area within 305 but outside 304 does not contain pixels that are validated seeding points, consequently the pixels in the region outside 305 cannot be neighbors to already validated seeding points and the region grow rule will terminate.

The neighboring pixel selection is not complicated as only neighboring pixels are involved. In 2D, the simplest scheme is to select four direct adjacent pixels of a given pixel. For example, the four gray pixels 204 are the four direct adjacent pixels of the given pixel 202. In 3D, the simplest scheme is to select the six direct adjacent pixels of a given pixel in a similar fashion. Other types of neighborhood can also be used.

Region growing or neighborhood growing is known. See, for example, "Insight into Images: Principles and Practice for Segmentation, Registration, and Image Analysis", section 5.3 (Region Growing) at pages 124 to 126, edited by Terry Yoo and "Digital Image Processing", second edition, Rafael C. Gonzalez and Richard E. Woods, Prentice Hall, Section 10.4.2 (Region Growing) at pages 613 to 615, both of which are hereby incorporated by reference. Also, see, "The ITK Software Guide: Second Edition Updated for ITK version 2.4", by Luis Ibáñez Will Schroeder, Lydia Ng, Josh Cates and the Insight Software Consortium, section 9.1 (Region Growing) at pages 503 to 524, which is also incorporated by reference. Further, see, "Image Segmentation Techniques" by Haralick and Shapiro, Computer Vision, Graphics and Image Processing, Vol. 29, pp. 100-132, January 1985, which is also incorporated by reference.

Figure 4:
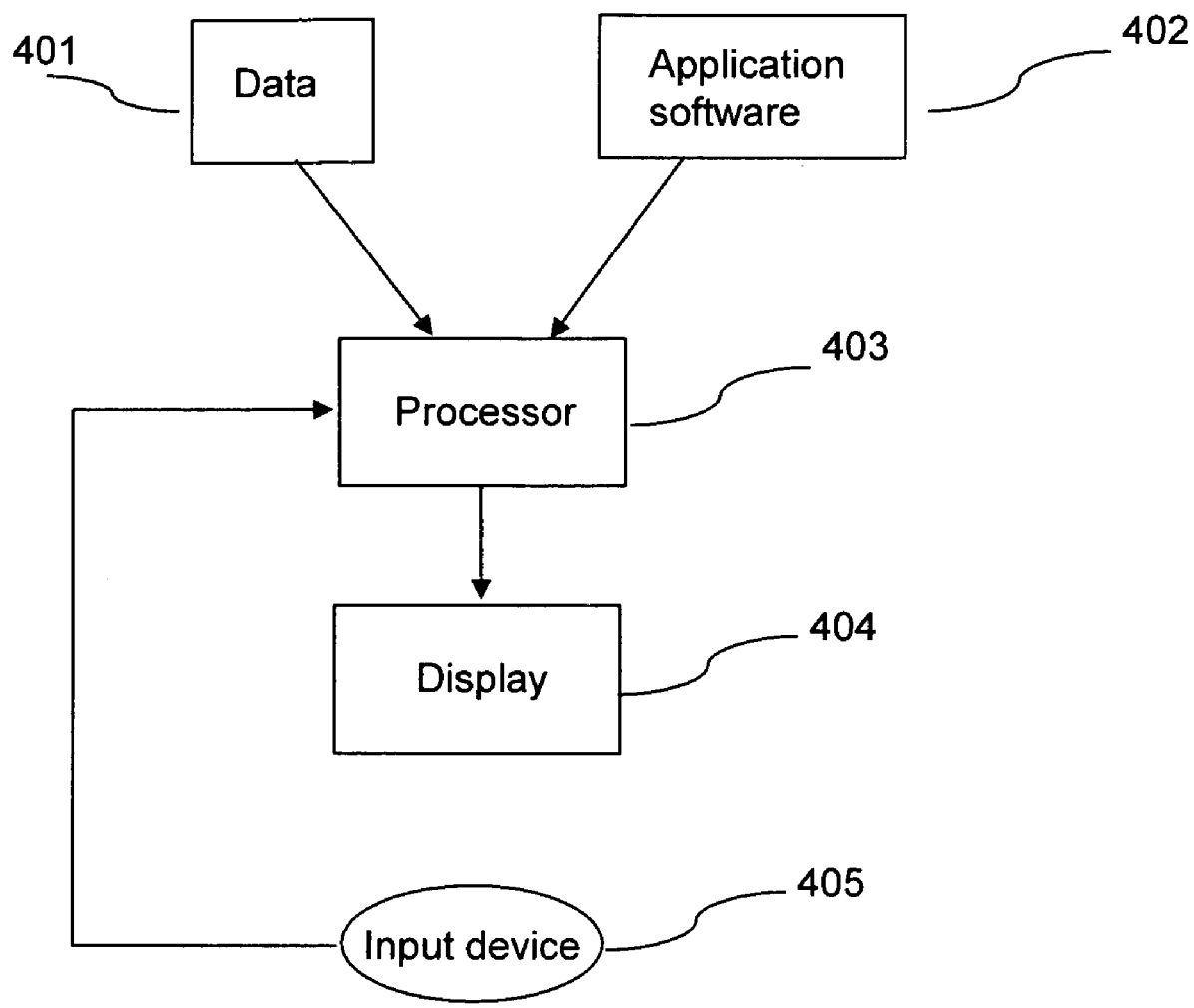
FIG. 4 illustrates a system in accordance with a further aspect of the present inventions.

Now referring to FIG. 4, a diagram is provided showing the means for performing the steps in the claims. Preferably, software application 402 is loaded onto the processor 403 as illustrated in FIG. 4. The data 401 representing the diffusion tensor image with all the relevant voxel (or pixel) information is also made available to the processor 403. While the term 'processor' is used for 403, it is to be understood that this can comprise a dedicated, special purpose computer, a generic multi-purpose microprocessor, a combination of parallel microprocessors, a workstation or any device that is able to execute and process the data of 401 following the procedures of the present invention. Alternatively, any one of the means for performing the steps in the claims can be a special purpose hardware circuit or a combination hardware/software circuit. The image can be displayed on a computer monitor 404 or any other display device. Device 405 is an input device, such as a mouse, track-ball or tablet which allows a user to select an initial seeding point in a region of interest in an MRI image.

Figure 5:
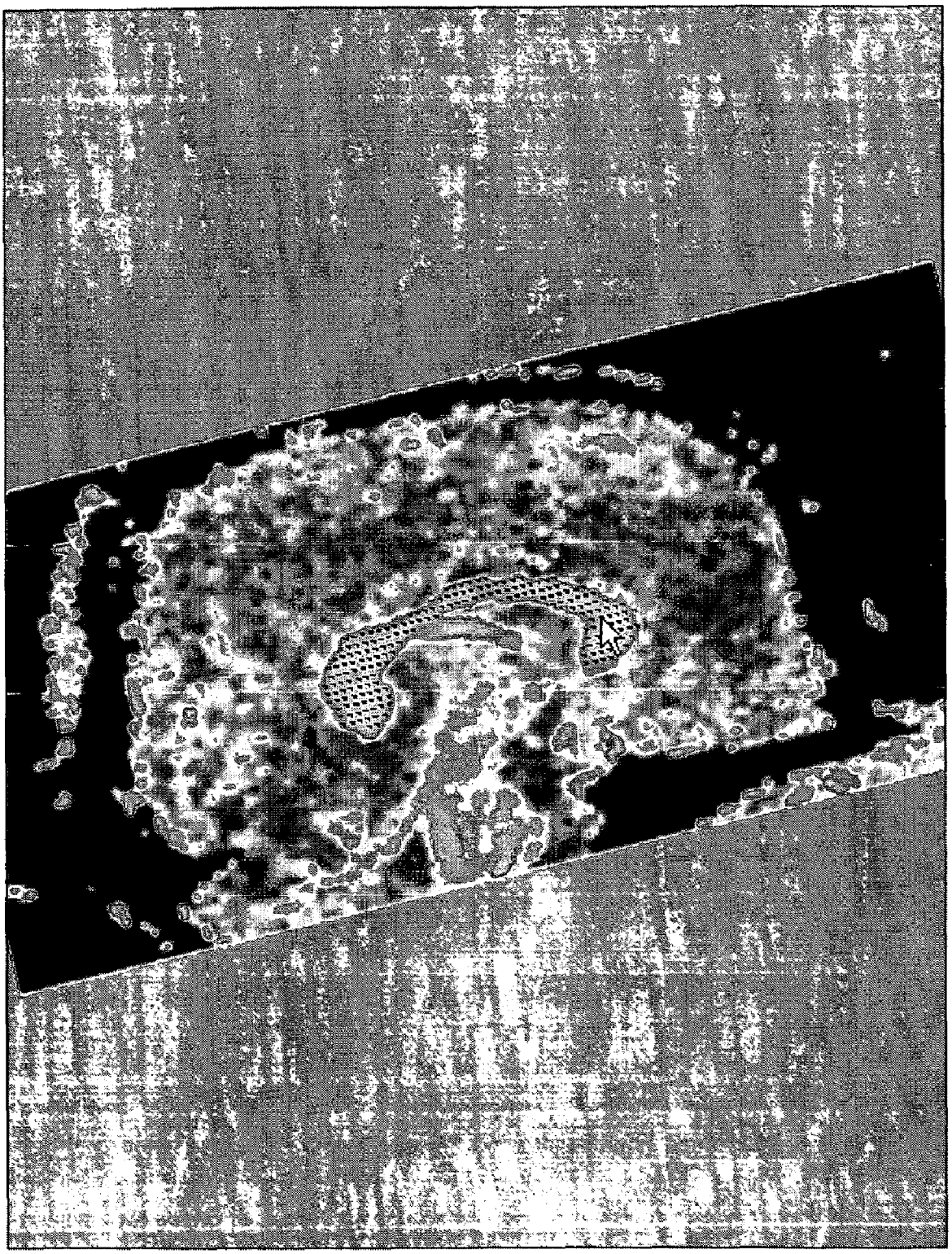
FIG. 5 illustrates a digital image with an object selected in accordance with one aspect of the present invention.

Now referring to FIG. 5, an example of the result of the present invention is shown. It shows a slice of the fractional anisotropy image derived from a diffusion tensor image that consists of the Corpus Callosum. The arrow is where one clicks the input device (405)—like a mouse—to create an initial seeding point. The crescent shaped light area in FIG. 5, containing the mouse cursor, shows the dots that are centers of selected voxels that are determined to belong to an object designated by the initial seeding point.

Any reference to the term pixel herein shall also be deemed a reference to a voxel.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

We claim:

1. A method of processing a digital image having an object and a selected pixel from the digital image, comprising: using a processor to perform the steps of:
    selecting a second pixel in the digital image;
    determining whether an Fractional Anisotropy (FA) value associated with the second pixel is greater than or equal to a first threshold;
    determining whether a difference between a Dominant Eigen Vector (DEV) value associated with the second pixel and a DEV value associated with the selected pixel is less than or equal to a second threshold; and
    if the FA value associated with the second pixel is greater than or equal to the first threshold and the difference between the DEV values is less than or equal to the second threshold, then establish a set having the second pixel and the selected pixel as elements selecting a plurality of pixels in the digital image; for one of the plurality of pixels, determining whether an FA value associated with the one of the plurality of pixels is greater than or equal to the first threshold, determining whether a difference between a DEV value associated with the one of the plurality of pixels and a DEV value associated with the selected pixel is less than or equal to a second threshold, and if the FA value associated with the one of the plurality of pixels is greater than or equal to the first threshold and the diffrence between a DEV value associated with the one of the plurality of pixels and a DEV value associated with the selected pixel is less than or equal to the second threshold, then include the one of the plurality of pixels in the set; and, repeating the previous step for each of the plurality of pixels.

2. The method as claimed in claim 1, wherein the selected pixel has an FA value greater than or equal to the first threshold.

3. The method as claimed in claim 1, comprising selecting the pixels in the set as the object.

4. The method as claimed in claim 1, comprising selecting the plurality of pixels by a neighboring pixel selection process.

5. The method as claimed in claim 1, comprising selecting the plurality of pixels by a neighboring pixel selection process wherein processing in a direction in the digital image stops when not a single pixel of the plurality of pixels satisfies: FA value associated with the pixel is greater than or equal to the first threshold and the difference between the DEV value associated with the pixel and the DEV value associated with the selected pixel is less than or equal to the second threshold.

6. The method as claimed in claim 1, wherein the second threshold is user selected.

7. The method as claimed in claim 1, wherein the first threshold is user selected.

8. The method as claimed in claim 1, wherein the first threshold and the second threshold are preset in a software application.

9. The method as claimed in claim 8, wherein the first threshold is 0.2.

10. A system for processing a digital image having an object and a selected pixel from the digital image, comprising:
    means for selecting a second pixel in the digital image;
    means for determining whether an Fractional Anisotropy (FA) value associated with the second pixel is greater than or equal to a first threshold;
    means for determining whether a difference between a Dominant Eigen Vector(DEV) value associated with the second pixel and a DEV value associated with the selected pixel is less than or equal to a second threshold; and
    means for establishing a set having the second pixel and the selected pixel as elements if the FA value associated with the second pixel is greater than or equal to the first threshold and the difference between the DEV values is less than or equal to the second threshold means for selecting a plurality of pixels in the digital image; means for each one of the plurality of pixels, determining whether an FA value associated with the one of the plurality of pixels is greater than or equal to the first threshold, for determining whether a difference between a DEV value associated with the one of the plurality of pixels and a DEV value associated with the selected pixel is less than or equal to a second threshold, and if the FA value associated with the one of the plurality of pixels is greater than or equal to the first threshold and the difference between a DEV value associated with the one of the plurality of pixels and a DEV value associated with the selected pixel is less than or equal to the second threshold, for including the one of the plurality of pixels in the set; and, repeating the previous step for each of the plurality of pixels.

11. The system as claimed in claim 10, wherein the selected pixel has an FA value greater than or equal to the first threshold.

12. The system as claimed in claim 10, comprising means for selecting the pixels in the set as the object.

13. The system as claimed in claim 10, comprising means for selecting the plurality of pixels by a neighboring pixel selection process.

14. The system as claimed in claim 10, comprising means for selecting the plurality of pixels by a neighboring pixel selection process wherein processing in a direction in the digital image stops when not a single pixel of the plurality of pixels satisfies: FA value associated with the pixel is greater than or equal to the first threshold and the difference between the DEV value associated with the pixel and the DEV value associated with the selected pixel is less than or equal to the second threshold.

15. The system as claimed in claim 10, wherein the second threshold is user selected.

16. The system as claimed in claim 10, wherein the first threshold is user selected.

17. The system as claimed in claim 10, wherein the first threshold and the second threshold are preset in a software application.

18. The system as claimed in claim 17, wherein the first threshold is 0.2.

* * * * *